(12) United States Patent
Dunne

(10) Patent No.: US 9,897,690 B2
(45) Date of Patent: Feb. 20, 2018

(54) TECHNIQUE FOR A PULSE/PHASE BASED LASER RANGEFINDER UTILIZING A SINGLE PHOTODIODE IN CONJUNCTION WITH SEPARATE PULSE AND PHASE RECEIVER CIRCUITS

(71) Applicants: Laser Technology, Inc., Centennial, CO (US); Kama-Tech (Hk) Limited, Tsim Sha Tsui (CN)

(72) Inventor: Jeremy G. Dunne, Parker, CO (US)

(73) Assignees: LASER TECHNOLOGY, INC., Centennial, CO (US); KAMA-TECH (HK) LIMITED, Hong Kong (CN)

( * ) Notice: Subject to any disclaimer, the term of this patent is extended or adjusted under 35 U.S.C. 154(b) by 646 days.

(21) Appl. No.: 14/524,837

(22) Filed: Oct. 27, 2014

(65) Prior Publication Data

US 2016/0116575 A1    Apr. 28, 2016

(51) Int. Cl.
| | |
|---|---|
| *G01C 3/08* | (2006.01) |
| *G01S 7/486* | (2006.01) |
| *G01S 17/10* | (2006.01) |
| *G01S 17/36* | (2006.01) |
| *G01S 7/491* | (2006.01) |

(52) U.S. Cl.
CPC ............ *G01S 7/486* (2013.01); *G01S 7/4912* (2013.01); *G01S 17/10* (2013.01); *G01S 17/36* (2013.01)

(58) Field of Classification Search
CPC ........ G01S 7/486; G01S 7/4917; G01S 17/36; G01S 17/10
USPC ....................................................... 356/5.01
See application file for complete search history.

(56) References Cited

U.S. PATENT DOCUMENTS

| | | | | |
|---|---|---|---|---|
| 4,533,224 | A | | 8/1985 | Ou |
| 4,567,446 | A | | 1/1986 | Konishi |
| 5,146,079 | A | | 9/1992 | Lisco |
| 5,477,321 | A | | 12/1995 | Johnson |
| 5,574,552 | A | * | 11/1996 | Dunne ..................... G01C 3/08 342/134 |
| 5,612,779 | A | * | 3/1997 | Dunne ..................... G01C 3/08 342/134 |

(Continued)

FOREIGN PATENT DOCUMENTS

| | | |
|---|---|---|
| CN | 201876545 U | 6/2011 |
| CN | 101852851 B | 6/2012 |

(Continued)

OTHER PUBLICATIONS

Patent Cooperation Treaty International Preliminary Report on Patentability and Written Opinion of the International Searching Authority; PCT/US2013/059032; dated Mar. 17, 2015; 12 pages.

(Continued)

*Primary Examiner* — Mark Hellner
(74) *Attorney, Agent, or Firm* — William J. Kubida; Hogan Lovells US LLP

(57) ABSTRACT

A technique for a pulse/phase based laser rangefinding instrument utilizing a single photodiode in conjunction with separate pulse and phase receiver circuits. The photodiode receives phase and pulse ranging signals and a capacitor coupled to the photodiode and is operative to provide current through the photodiode to a transimpedance amplifier in a pulse mode of operation and from the photodiode through a tuned circuit to a narrow band amplifier in a phase mode of operation.

37 Claims, 2 Drawing Sheets

(56) References Cited

U.S. PATENT DOCUMENTS

| | | | |
|---|---|---|---|
| 5,652,651 A * | 7/1997 | Dunne | G01C 3/08 342/91 |
| 5,703,678 A | 12/1997 | Dunne | |
| 5,880,821 A | 3/1999 | Dunne | |
| 6,043,868 A | 3/2000 | Dunne | |
| 6,057,910 A | 5/2000 | Dunne | |
| 6,226,077 B1 | 5/2001 | Dunne | |
| 6,445,444 B2 | 9/2002 | Dunne | |
| 6,608,677 B1 | 8/2003 | Ray et al. | |
| 6,658,329 B1 | 12/2003 | Howard et al. | |
| 6,756,578 B1 | 6/2004 | Kaiser | |
| 7,207,983 B2 | 4/2007 | Hahn et al. | |
| 7,301,616 B2 | 11/2007 | Foley | |
| 7,667,598 B2 | 2/2010 | Yenisch et al. | |
| 7,852,461 B2 | 12/2010 | Yahav | |
| 9,246,023 B2 * | 1/2016 | Laforce | H01L 31/02019 |
| 2001/0012104 A1 | 8/2001 | Dunne | |
| 2002/0145105 A1 * | 10/2002 | Rhoads | G02B 23/00 250/208.1 |
| 2002/0190890 A1 | 12/2002 | Pergande | |
| 2003/0076484 A1 | 4/2003 | Bamji et al. | |
| 2005/0174560 A1 | 8/2005 | Imber et al. | |
| 2005/0200831 A1 | 9/2005 | Staley, III et al. | |
| 2005/0275826 A1 | 12/2005 | Ohtomo et al. | |
| 2006/0285233 A1 | 12/2006 | Dunne | |
| 2007/0127009 A1 | 6/2007 | Chen et al. | |
| 2007/0182952 A1 | 8/2007 | Nishita et al. | |
| 2008/0218743 A1 | 9/2008 | Stetten et al. | |
| 2009/0046271 A1 | 2/2009 | Constantikes | |
| 2009/0079958 A1 * | 3/2009 | Gunther | G01S 7/481 356/5.01 |
| 2010/0045966 A1 | 2/2010 | Cauquy et al. | |
| 2010/0271616 A1 | 10/2010 | Suzuki et al. | |
| 2011/0131824 A1 | 6/2011 | Yanobe et al. | |
| 2011/0216305 A1 | 9/2011 | Hayashi et al. | |
| 2011/0279808 A1 | 11/2011 | Dunne | |
| 2011/0292371 A1 | 12/2011 | Chang | |
| 2012/0140201 A1 | 6/2012 | Grauslys et al. | |
| 2012/0262730 A1 | 10/2012 | Brown et al. | |
| 2014/0071425 A1 | 3/2014 | Dunne | |
| 2014/0071426 A1 | 3/2014 | Dunne | |
| 2014/0071432 A1 | 3/2014 | Dunne | |
| 2014/0307248 A1 | 10/2014 | Giger et al. | |

FOREIGN PATENT DOCUMENTS

| | | |
|---|---|---|
| EP | 1102034 B1 | 5/2006 |
| EP | 1903302 A2 | 3/2008 |
| JP | 09304055 A | 11/1997 |
| KR | 20070103533 A | 10/2007 |
| KR | 20090104326 A | 10/2009 |
| KR | 20090121609 A | 11/2009 |

OTHER PUBLICATIONS

PCT International Search Report and Written Opinion, dated Jan. 11, 2016, International Application No. PCT/US15/54167, 10 pages.
Extended European Search Report for Application No. 13837644.7 dated Apr. 1, 2016 (8 pages).
Australian Patent Examination Report No. 1 for Patent Application No. 2013315687, dated Sep. 19, 2016, 2 pgs.
International Search Report and Written Opinion for PCT/US2013/059023, dated Dec. 12, 2013.
International Search Report and Written Opinion for PCT/US2013/059037, dated Dec. 16, 2013.
International Preliminary Report on Patentability for PCT/US2015/054167, dated May 11, 2017, 9 pages.

* cited by examiner

US 9,897,690 B2

TECHNIQUE FOR A PULSE/PHASE BASED LASER RANGEFINDER UTILIZING A SINGLE PHOTODIODE IN CONJUNCTION WITH SEPARATE PULSE AND PHASE RECEIVER CIRCUITS

CROSS REFERENCE TO RELATED PATENT APPLICATIONS

The present invention is related to the subject matter of United States Patent Application Publication Serial Nos. 2014/0071432 for: "System and Method for a Rangefinding Instrument Incorporating Pulse and Continuous Wave Signal Generating and Processing Techniques for Increased Distance Measurement Accuracy"; 2014/0071425 for "System and Method for Superimposing a Virtual Aiming Mechanism with a Projected System Beam in a Compact Laser-Based Rangefinding Instrument" and 2014/0071426 for: "Self-Aligned Aiming System and Technique for a Laser Rangefinder Incorporating a Retroreflector" all filed Sep. 13, 2012 and assigned to the assignees hereof, the disclosures of which are herein specifically incorporated by this reference in their entirety.

BACKGROUND OF THE INVENTION

The present invention relates, in general, to the field of laser rangefinders and rangefinding instruments. More particularly, the present invention relates to a technique for a pulse/phase based laser rangefinder utilizing a single photodiode in conjunction with separate pulse and phase receiver circuits.

Numerous types of ranging devices have been introduced for measuring distances in situations in which traditional tape measures have previously been employed. For such applications, compact design and cost considerations are important factors in addition to ease of use and overall device accuracy.

Certain of these designs are pulse-based laser systems which utilize a time-of-flight measurement technique to compute the distance to a particular target based on the time it takes for a transmitted pulse to reach the target and be reflected back therefrom. Among the disadvantages of such pulse-based devices is that, in order to achieve high levels of accuracy, rather complicated timing circuitry is required in addition to ensuring that the device remains properly calibrated for the then current operating conditions. Representative circuitry and associated signal processing techniques for such a pulse-based laser range finder are disclosed, for example, in the following United States patents assigned to Laser Technology, Inc. and Kama-Tech (HK) Limited, assignees of the present invention: U.S. Pat. Nos. 5,574,552; 5,612,779; 5,652,651; 5,703,678; 5,880,821; 6,057,910; 6,226,077 and 6,445,444. The disclosures of these patents are herein specifically incorporated by this reference in their entirety.

An alternative technique for measuring distances employs phase-based techniques in which a continuous wave (CW) or discreet bursts of essentially continuous wave signals are directed toward a target and the phase of the backscatter signal that is reflected back therefrom is determined. Among the advantages of such CW systems is that, for similar or lower costs than a pulse-based system, it is possible to achieve potentially higher accuracy with simpler electronics due, at least in part, to the fact that the small CW diodes will turn "on" and "off" more quickly than the larger infrared (IR) pulse diodes used in pulse-based systems.

However, among the difficulties inherent in implementations of such phase-based systems is that the unambiguous range of the instrument is the period of the CW signal divided by two. In other words, assuming a 50 MHz signal which has a cycle time of 20 nsec., a flight distance of about 10 feet is covered so it is not possible to discriminate based on that information alone whether the target is at 10 feet, 20 feet, 30 feet or the like. Known techniques for dealing with this ambiguity include generating and transmitting multiple frequencies or dividing down the device clock frequency to produce varying transmission frequencies. All of these solutions require ever more complicated circuitry and the problem they attempt to solve becomes increasingly more difficult to address as the distance from the target increases.

A comparison of pulse-based systems with phase-based systems shows that the former can effectively distinguish between dust or other debris or interference between the signal source and the intended target. In other words, a pulse-based system can distinguish between multiple targets. On the other hand, in phase-based systems the phase return is the vector sum of the backscatter from the target and the interfering dust or other object and there is no easy way of discriminating between the two.

Therefore, a need has existed for a compact, low cost rangefinding instrument which is inexpensive, reliable and highly accurate and would essentially provide the benefits of both pulse-based and phase-based ranging systems while compensating for, or overcoming, the inherent disadvantages of the other as disclosed and in the afore-mentioned United States Patent Application Publication Serial No. 2014/0071432.

SUMMARY OF THE INVENTION

The present invention advantageously provides an efficient, cost-effective technique for a pulse/phase based laser rangefinder utilizing a single photodiode in conjunction with separate pulse and phase receiver circuits.

Particularly disclosed herein is a laser rangefinding instrument having phase and pulse modes of operation which comprise a photodiode operative to receive phase and pulse ranging signals and a device (e.g. a capacitor) coupled to the photodiode and operative to provide current through the photodiode to a first amplifier in the pulse mode of operation and from the photodiode through an impedance transformation tuned circuit, or other impedance transformation circuit, to a second amplifier in the phase mode of operation.

Also particularly disclosed herein is a method for operation of a laser rangefinding instrument receiver having phase and pulse modes of operation which comprises the steps of coupling one terminal of a capacitor to a first terminal of a photodiode, coupling an opposite terminal of the capacitor to a reference potential and a second terminal of the photodiode to a first amplifier in the pulse mode of operation, and alternatively coupling the second terminal of the photodiode to the reference potential and the opposite terminal of the capacitor through an impedance transformation circuit to a second amplifier in the phase mode of operation.

Still further disclosed herein is a laser rangefinding instrument having phase and pulse modes of operation comprising a photodiode operative to receive phase and pulse ranging signals and selectively coupleable to first and second amplifiers, the photodiode providing current to the first amplifier in the pulse mode of operation and through an impedance transformation circuit to the second amplifier in the phase mode of operation.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1:
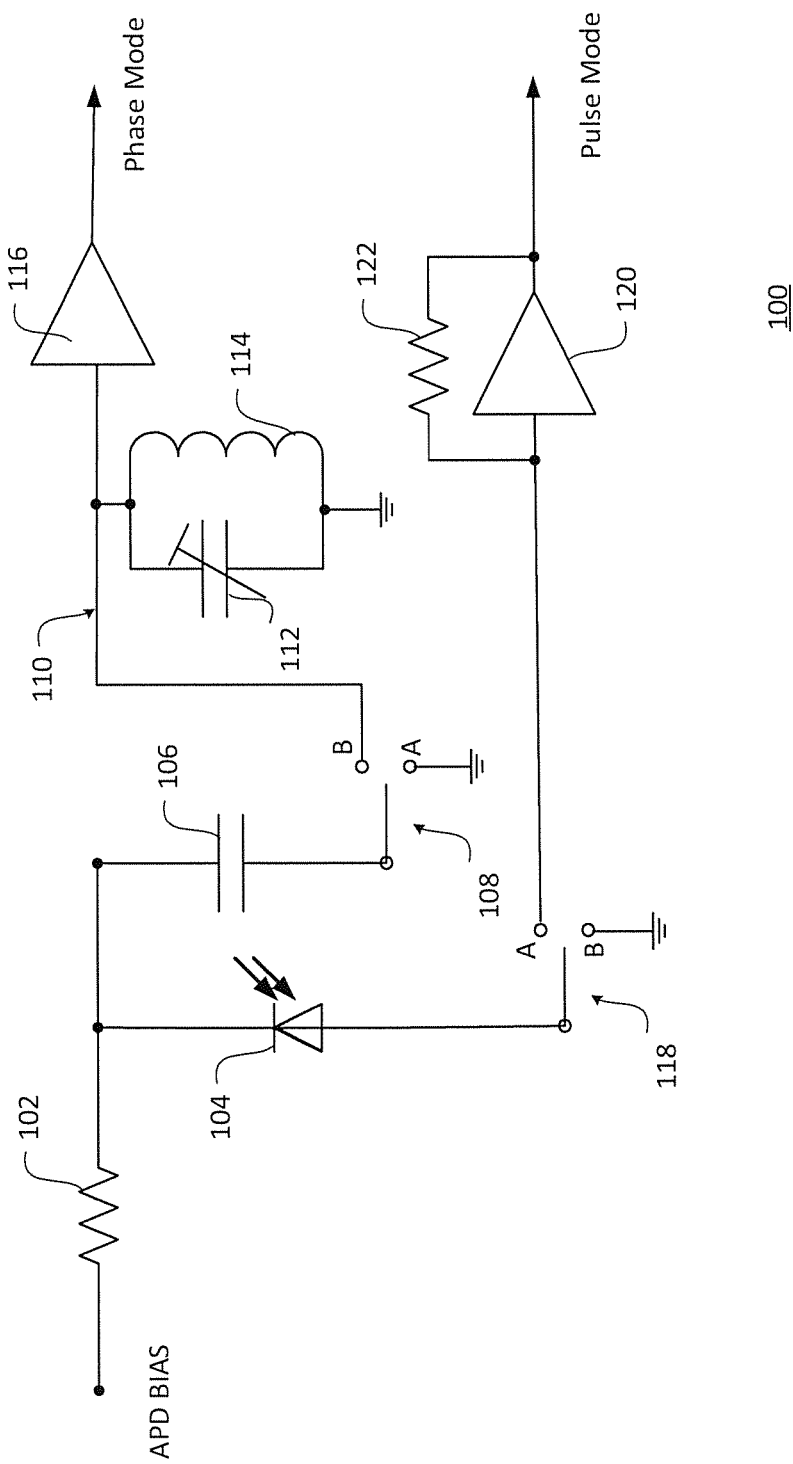
FIG. 1 is a schematic illustration a representative embodiment of a portion of the receiver of a pulse/phase based laser rangefinder utilizing a single photodiode in conjunction with separate pulse and phase receiver circuits in accordance with the present invention.

With reference now to FIG. 1, a schematic illustration a representative embodiment of a portion of a receiver 100 of a pulse/phase based laser rangefinder in accordance with the present invention is shown. The receiver 100 comprises an avalanche photodiode (APD) bias input to a current limiting resistor 102 coupled to the cathode terminal of a photodiode 104. The photodiode 104 has its anode terminal coupled to the common terminal of a first conceptual switch 118 as shown.

The first conceptual switch 118 has one terminal indicated as switch position (B) coupled to circuit ground and another terminal indicated as switch position (A) coupled to the input of a transimpedance amplifier 120 having a parallel coupled resistor 122 for providing a pulse mode output to subsequent rangefinder receiver circuitry.

A first terminal of a speedup capacitor 106 is also coupled to the current limiting resistor 102 as well as the cathode of the photodiode 104. A second terminal of the speedup capacitor 106 is coupled to the common terminal of a second conceptual switch 108. It should be noted that other devices may be substituted for speedup capacitor 106 such as a transformer coupled between the resistor 102 and the cathode of the photodiode 104.

The second conceptual switch 108 has one terminal indicated as switch position (A) coupled to circuit ground and another terminal indicated as switch position (B) coupled to a tuned circuit 110 comprising a variable capacitor 112 in series with an inductor 114. The output of the tuned circuit is coupled to the input of an amplifier 116 for providing a phase (or continuous wave) mode output to subsequent rangefinder receiver circuitry. It should be noted that in all embodiments of the present invention disclosed herein, other impedance transformation circuits and methods may be utilized in conjunction with, or in substitution for, the tuned circuit 110 illustrated and described.

When conceptual switches 108 and 118 are in the (A) switch position, the receiver 100 is in a pulse detection mode of operation. Conversely, when the conceptual switches 108 and 118 are in the (B) switch position, the receiver 100 is in a phase detection mode of operation. In an actual circuit implementation of the receiver 100, the conceptual switches 108, 118 may comprise PIN (P-type/Intrinsic/N-type region) diodes functioning as switches since, when a forward current is passed through them, they exhibit a very low resistance and effectively become a radio frequency (RF) short to circuit ground. On the other hand, when reverse biased, PIN diodes instead exhibit very low capacitance.

In operation, an APD bias voltage is applied to the current limiting resistor 102 and the speed up capacitor 106 associated with the photodiode 104. The current limiting resistor is incorporated into the design to prevent the photodiode 104 from being damaged in response to receipt of a strong pulse and the speedup capacitor 106 accelerates the receiver 100 response time which would otherwise be unacceptably slow. In a representative embodiment of the receiver 100 shown, the current limiting resistor 102 might have a value substantially in the range of between 100K ohms to 200K ohms and the speedup capacitor a value substantially in the range of between 100 picofarads (pf) to 200 pf.

In a pulse mode of operation, when a light pulse is sensed by the photodiode 104, current starts to flow from the speedup capacitor 106 through the photodiode 104 with the conceptual switches 108 and 118 in the switch position (A). In this configuration, one terminal of the speedup capacitor 106 is coupled to circuit ground through conceptual switch 108 and the anode of the photodiode 104 is coupled to the input of the transimpedance amplifier 120 through conceptual switch 118.

The transimpedance amplifier 120 may, in the representative embodiment illustrated, have a bandwidth of substantially 100 MHz although it could have a greater bandwidth as required. In contrast, the amplifier 116 used in the phase mode of operation may be tuned to a narrow band at 500 Mhz. If the transimpedance amplifier 120 where to also have a 500 MHz bandwidth, the signal-to-noise (S/N) ratio would become unacceptable irrespective of the amplifier structure inasmuch as the noise floor on the front end of the amplifier goes up rapidly due to the capacitance of the photodiode 104.

Basically, the transimpedance amplifier 120 functions as a current amplifier because the photodiode 104 is a current source. At relatively low frequencies then, only the current noise of the amplifier is dominant and provides a very good noise floor with either bipolar transistor and especially with field effect transistor (FET) input stages, the latter of which have almost no current noise. However, since all amplifiers exhibit at least some voltage noise, once the frequency goes up, the impedance of the photodiode 104 capacitance, other parasitic capacitances and other factors become low enough such that the input voltage (Vin) divided by those factors becomes an ever increasingly large current noise.

Stated another way, as the amplifier bandwidth goes up, the noise goes up more quickly than the bandwidth and the S/N ratio becomes unacceptably poor. If the noise were constant, then a shorter pulse and a higher bandwidth would be preferred because noise goes up as the square root of the bandwidth. Therefore, for a given pulse energy, the amplitude is inversely proportional to the pulse width. So, if there were a constant noise floor in the amplifier, it would be better to run at a higher bandwidth. However, at a certain point when the voltage noise of the narrow band amplifier 116 divided by the impedance of the stray capacitance of the photodiode 104 and the parasitic factors exceeds the current noise, then the noise increases faster than the signal and is ultimately a limiting factor on the design. Therefore, if the transimpedance amplifier 120 were to be designed in a conventional manner to match the bandwidth of the 500 MHz narrow band amplifier 116 its S/N ratio would be unacceptable.

In a phase mode of operation, the conceptual switches 108, 118 are in the (B) switch position and the anode of the photodiode 104 is grounded through the conceptual switch 118. In this configuration, the speedup capacitor 106 directs the signal current from the photodiode 104 to the narrow band tuned circuit 110 through the conceptual switch 108. The tuned circuit 110 allows for the matching of the relatively high impedance of the front end of the amplifier 116 and effectively allows for the tuning out of the capacitance of the photodiode 104 as it becomes part of the tuned circuit. In this manner, the Vin of the amplifier does not divide into the impedance or the capacitance of the photodiode 104 and instead is reflected into the impedance of the tuned circuit 110 which can be made very much higher such that the Vin does not increase the noise figure for the amplifier 116. Using an FET based amplifier, the current noise would be minimal.

In a representative embodiment of the present invention, the quality factor (Q) of the tuned circuit 110 might typically be about 50 and the tuned circuit 110 can run at almost any desired frequency with a concomitantly very good noise figure totally independent of the optimized bandwidth of the transimpedance amplifier 120 in the pulse mode channel. Effectively, the speedup capacitor 106 in the receiver 100 illustrated functions as either the signal source in the phase mode of operation in conjunction with the tuned circuit 110 and amplifier 116 or as the current source in a pulse mode of operation in conjunction with the transimpedance amplifier 120.

Figure 2:
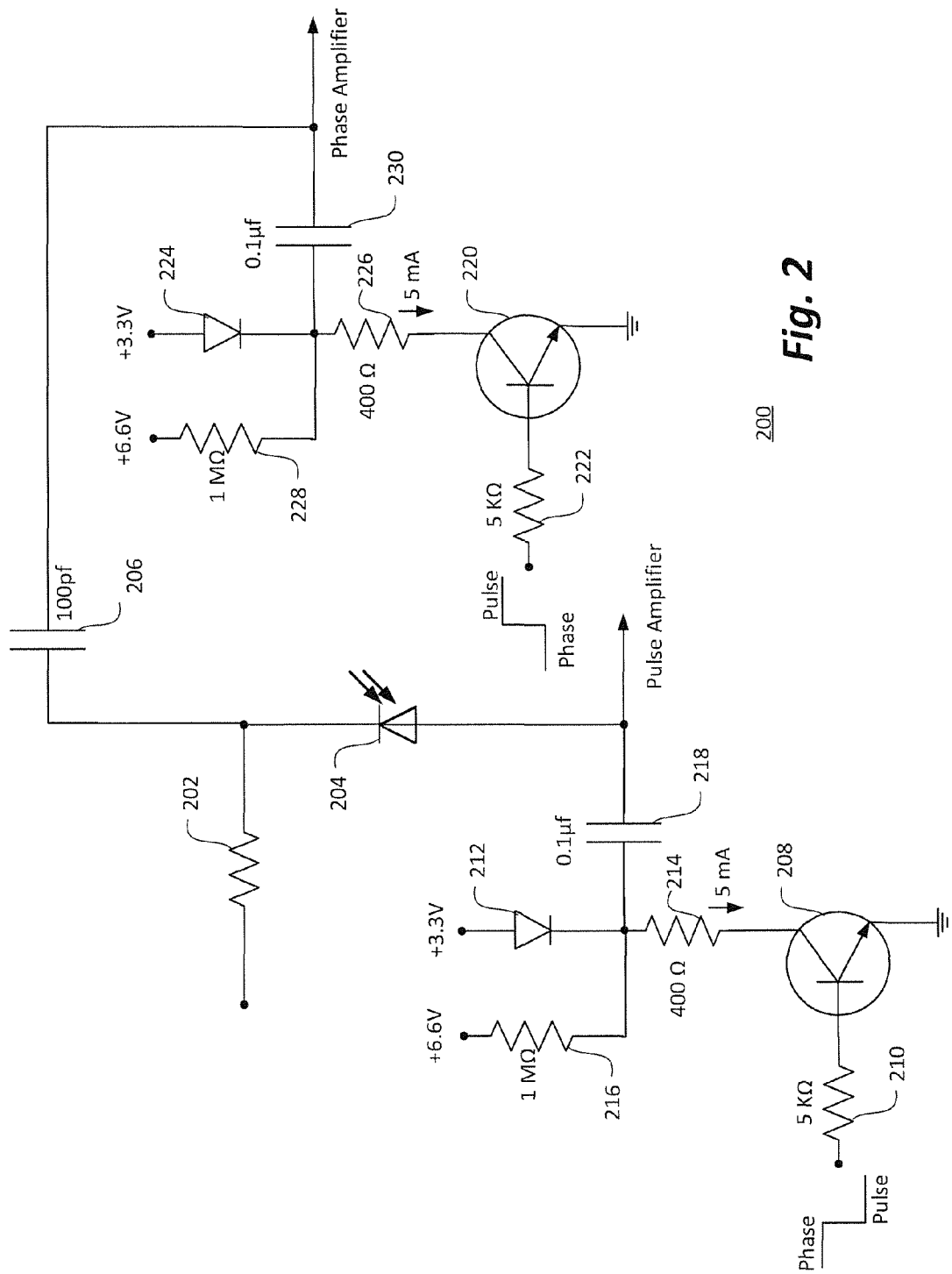
FIG. 2 is a detailed schematic illustration of a representative embodiment of a portion of the receiver of a pulse/phase based laser rangefinder utilizing PIN diodes and NPN transistors for implementation of the conceptual switches of the preceding figure.

With reference additionally now to FIG. 2, a detailed schematic illustration of a representative embodiment of a portion of a receiver 200 of a pulse/phase based laser rangefinder utilizing PIN diodes and NPN transistors is shown for implementation of the conceptual switches of the preceding figure. The receiver 200 comprises an avalanche photodiode (APD) bias input to a current limiting resistor 202 coupled to the cathode terminal of a photodiode 204. A first terminal of a speedup capacitor 206 is also coupled to the current limiting resistor 202 as well as the cathode of the photodiode 204.

A first switching circuit functioning as the conceptual switch 118 (FIG. 1) comprises an NPN transistor 208 which, in a representative embodiment of the receiver 200 may comprise ½ of a BFM505 dual NPN wideband transistor available from NXP Semiconductors N.V. The transistor 208 has its base terminal coupled through resistor 210 to receive a phase/pulse signal as indicated and has its emitter terminal coupled to a reference potential at circuit ground. A PIN diode 212 has its anode terminal coupled to a typical source of 3.3 volts and its cathode terminal coupled through a series resistor 214 to the collector terminal of transistor 208. A resistor 216 is coupled between a doubled voltage source of 6.6 volts and the node intermediate the PIN diode 212 and resistor 214. The same node is coupled to one terminal of capacitor 218, the other terminal of which provides an input to a pulse amplifier as previously described with respect to the receiver 100 of FIG. 1.

A second switching circuit functioning as the conceptual switch 108 (FIG. 1) comprises an NPN transistor 220 which, in a representative embodiment of the receiver 200 may comprise the other ½ of a BFM505 dual NPN wideband transistor as previously described. The transistor 220 has its base terminal coupled through resistor 222 to receive an opposite phase, phase/pulse signal as indicated and has its emitter terminal coupled to a reference potential at circuit ground. Another PIN diode 224 has its anode terminal coupled to the source of 3.3 volts and its cathode terminal coupled through a series resistor 226 to the collector terminal of transistor 220. A resistor 228 is coupled between the doubled voltage source of 6.6 volts and the node intermediate the PIN diode 224 and resistor 226. This same node is coupled to one terminal of capacitor 230, the other terminal of which provides an input to a phase amplifier as previously described with respect to the receiver 100 of FIG. 1 and is also coupled to a second terminal of the speedup capacitor 206.

In the representative embodiment of the receiver 200 illustrated, the PIN diodes 212 and 224 may comprise BAR63 devices available from Infineon Technologies AG. The resistors 216 and 228 may comprise 1 MΩ devices, the resistors 210 and 222 may comprise 5KΩ devices and the resistors 214 and 226 may comprise 400Ω devices. The capacitors 218 and 230 may comprise 0.1 pf devices while the speedup capacitor 206 may comprise a 100 µf device.

With respect to the representative embodiments of the receivers 100 and 200, (as illustrated in FIGS. 1 and 2) it should be noted that the illustrated coupling of the phase and pulse mode amplifiers to the respective cathode and anode terminals of the photodiode 104 and 204 is made only by way of example and the pulse and phase mode amplifiers can be respectively coupled to the cathode and anode terminals instead.

While there have been described above the principles of the present invention in conjunction with specific circuitry, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A laser rangefinding instrument having phase and pulse modes of operation comprising:
   a photodiode operative to receive phase and pulse ranging signals; and a device coupled to said photodiode operative to provide current through said photodiode to a first amplifier in said pulse mode of operation and from said photodiode through an impedance transformation circuit to a second amplifier in said phase mode of operation.

2. The laser rangefinding instrument of claim 1 wherein said impedance transformation circuit comprises a tuned circuit.

3. The laser rangefinding instrument of claim 1 wherein said photodiode comprises an avalanche photodiode.

4. The laser rangefinding instrument of claim 1 wherein said photodiode comprises a PIN photodiode.

5. The laser rangefinding instrument of claim 1 wherein said device comprises a capacitor selectively coupleable to said first and second amplifiers through respective first and second switching elements.

6. The laser rangefinding instrument of claim 5 wherein said capacitor is substantially in the range of 100 pf to 200 pf.

7. The laser rangefinding instrument of claim 1 wherein said first amplifier comprises a transimpedance amplifier.

8. The laser rangefinding instrument of claim 7 wherein said transimpedance amplifier has a bandwidth of substantially 100 MHz.

9. The laser rangefinding instrument of claim 1 wherein said second amplifier comprises a narrow band amplifier.

10. The laser rangefinding instrument of claim 9 wherein said narrow band amplifier has a center frequency of substantially 500 MHz.

11. The laser rangefinding instrument of claim 1 wherein said tuned circuit comprises a parallel coupled capacitor and inductor.

12. The laser rangefinding instrument of claim 11 wherein said parallel coupled capacitor of said tuned circuit comprises a variable capacitor.

13. The laser rangefinding instrument of claim 1 further comprising:
a current limiting resistor coupled between a bias voltage source and a cathode of said photodiode.

14. The laser rangefinding instrument of claim 5 further comprising:
a first PIN diode coupling an anode of said photodiode to a reference potential; and
a second PIN diode coupling said capacitor to said reference potential.

15. A method for operation of a laser rangefinding instrument receiver having phase and pulse modes of operation comprising:
coupling one terminal of a capacitor to a first terminal of a photodiode;
coupling an opposite terminal of said capacitor to a reference potential and a second terminal of said photodiode to a first amplifier in said pulse mode of operation; and
alternatively coupling said second terminal of said photodiode to said reference potential and said opposite terminal of said capacitor through an impedance transformation circuit to a second amplifier in said phase mode of operation.

16. The method of claim 15 further comprising:
receiving phase and pulse ranging signals at said photodiode.

17. The method of claim 15 wherein said photodiode comprises an avalanche photodiode.

18. The method of claim 15 wherein said photodiode comprises a PIN photodiode.

19. The method of claim 15 wherein said first amplifier comprises a transimpedance amplifier.

20. The method of claim 19 wherein said transimpedance amplifier has a bandwidth of substantially 100 MHz.

21. The method of claim 15 wherein said second amplifier comprises a narrow band amplifier.

22. The method of claim 21 wherein said narrow band amplifier has a bandwidth of substantially 500 MHz.

23. The method of claim 15 wherein said impedance transformation circuit comprises a parallel coupled capacitor and inductor.

24. The method of claim 23 wherein said parallel coupled capacitor of said impedance transformation circuit comprises a variable capacitor.

25. The method of claim 15 further comprising:
coupling a current limiting resistor between a bias voltage source and said first terminal of said photodiode.

26. The method of claim 15 wherein said first and second terminals of said photodiode comprise cathode and anode terminals respectively.

27. A laser rangefinding instrument having phase and pulse modes of operation comprising:
a photodiode operative to receive phase and pulse ranging signals; and
first and second amplifiers selectively coupleable to said photodiode, said photodiode providing current to said first amplifier in said pulse mode of operation and through an impedance transformation circuit to said second amplifier in said phase mode of operation.

28. The laser rangefinding instrument of claim 27 wherein said impedance transformation circuit comprises a tuned circuit.

29. The laser rangefinding instrument of claim 27 wherein said photodiode comprises an avalanche photodiode.

30. The laser rangefinding instrument of claim 27 wherein said photodiode comprises a PIN photodiode.

31. The laser rangefinding instrument of claim 27 wherein said first amplifier comprises a transimpedance amplifier.

32. The laser rangefinding instrument of claim 31 wherein said transimpedance amplifier has a bandwidth of substantially 100 MHz.

33. The laser rangefinding instrument of claim 27 wherein said second amplifier comprises a narrow band amplifier.

34. The laser rangefinding instrument of claim 33 wherein said narrow band amplifier has a center frequency of substantially 500 MHz.

35. The laser rangefinding instrument of claim 27 wherein said impedance transformation circuit comprises a parallel coupled capacitor and inductor.

36. The laser rangefinding instrument of claim 35 wherein said parallel coupled capacitor of said impedance transformation circuit comprises a variable capacitor.

37. The laser rangefinding instrument of claim 27 further comprising:
a current limiting resistor coupled between a bias voltage source and a cathode of said photodiode.

* * * * *